2,860,992

PROCESS OF MANUFACTURING LIVER SAUSAGE

Marvin M. Voegeli, Downers Grove, and Robert H. Harper, Park Forest, Ill., assignors to Swift & Company, Chicago, Ill., a corporation of Illinois No Drawing. Application February 21, 1955
Serial No. 489,784

5 Claims. (Cl. 99—109)

This invention relates to a method of manufacturing a sausage item having a high fat content with a stable emulsion, and is particularly adaptable to the manufacture of liver sausage or Braunschweiger.

A typical liver sausage made by conventional methods of manufacture will contain on the order of 50–60 percent moisture, 25–15 percent fat with the balance being protein, spices, curing salts, etc. If the moisture content could be lowered and the fat content raised, the product would be more desirable from a nutritional standpoint. It has not been possible to increase greatly the percentage of fat in liver sausage for the reason that a larger amount of fat results in an unstable emulsion, which is evidenced by the "greasing out" of the finished product.

It is an object of this invention to provide a method for manufacturing a sausage, such as Braunschweiger, which will have a higher fat content and a lower percentage of moisture.

Another object is to provide a method of manufacturing a liver-type sausage having a more creamy texture.

Still another object is to devise a manner of manufacturing a liver-type sausage that will have improved spreadability and flavor.

We have discovered a method that will permit the incorporation of more fat in a sausage item without impairment of the stability of the emulsion. Braunschweiger made in accordance with the process of our invention has a more cream-like consistency and is more readily spread. An increase in the fat content enhances the flavor of the liver sausage.

Broadly speaking, we contemplate, in the manufacture of a sausage having a high fat content, the steps of chopping the meat and the fat together to form an emulsion, with the chopping being discontinued when the temperature of the emulsion is within the range of 88–122° F. The emulsion is next stuffed into casings, and following this, the stuffed sausage is cooked to denature the protein of the meat. The cooking operation is commenced before the emulsion has cooled below 88° F.

In the preparation of the emulsion it is desirable that the emulsion be removed from the chopper when it is at a temperature within the range of 88–122° F., and preferably at a temperature within the more limited range of 95–105° F. We have found that if the emulsion becomes too hot, there may be a denaturing of the liver protein during the chopping operation which lessens the binding qualities of the product, resulting in fat separation, and if the temperature of the emulsion out of the chopper be less than 88° F., there is likewise fat separation or "greasing out." The emulsion should be stuffed and cooked before its temperature falls below 88° F. to avoid fat separation.

There are various ways of forming the high fat content sausage. In one embodiment of our invention the fat is pre-heated and added to the meat during the preparation of the emulsion in a conventional chopper of the type used throughout the packing industry. In another method the fat and the meat are preground and then force-fed into a sanitary stainless steel high-speed hammer mill, without preheating of any of the constituents. Due to the high-speed operation of this mill there is a considerable rise in temperature during the formation of the emulsion. Again, as in the practice of the process with a conventional chopper, the emulsion is removed at a temperature within the range of 88–122° F.

Historically the packing industry has in the manufacture of sausage items, including Braunschweiger, chopped the meat components with added ice for the purpose of preventing too great a rise in the temperature of the emulsion. Temperatures in excess of 60° F. are generally avoided.

The following are three examples of the use of our process in the manufacture of a high-fat content, liver-type sausage:

Example I

The formula of the meat entering into the product of this example consisted of 5 lbs. pork liver, 5 lbs. skinned neck fat, 1.5 lbs. cured cow meat, and 1 lb. cured bacon ends and pieces. Normal liver sausage spicings were used. No ice or water was incorporated.

The neck fat, the cured beef, and bacon ends were dry-heated to a temperature of 190° F. and the liquid fat portion which was rendered out was separated from the hot solids through a screen. The livers were chopped in a chopper along with the spices. The liquid fat portion was then added while still hot, and chopping continued until the mixture was well blended. At this point the rendered hot solid portion was added and the chopping continued until a fine emulsion was obtained. The temperature of the emulsion out of the chopper was approximately 105° F. The emulsion was vacuumized, stuffed into saran casings, and the stuffed sausage immediately cooked in 160° F. water until an internal temperature of approximately 152° F. was reached, requiring 35 minutes. The product analyzed to be 45.1 percent moisture, 36.5 percent fat, and 13.0 percent protein and was found stable without any evidence of fat separation as would normally be expected in a liver sausage containing such a high percentage of fat. It will be noted that the fat percent is well above that normally obtainable with conventional manufacturing procedures.

Example II

The work of this example differs from the preceding in that the neck fat was preheated by boiling in water rather than subjecting it to a dry-heat treatment. In the instant example, the fat pieces were cut into chunks approximately 2" x 2" x 4" and boiled in water for approximately 15 minutes. The temperature of the chunk fat ranged between 145–165° F. This manner of preheating the fat resulted in very little separation of the softer fats in contrast to the previous example in which the neck fat was dry-heated, giving a significant rendering out of the softer fats.

Two hundred and twenty lbs. of pork liver, 180 lbs. neck fat, 5 lbs. cow meat, and 5 lbs. bacon ends and pieces were used. The liver was scalded for 10 seconds in 212° F. water before chopping to lessen the likelihood of any later bitter flavor due to the spilling of gall during the dressing of the liver. This flash scald did not significantly raise the temperature of the liver. The liver, bacon, and beef were placed in the chopper and chopped for ten minutes until fine, at which time conventional liver sausage spices and curing salts were added, and the chopping continued for an additional minute. The preheated neck fat, prepared as described above, was introduced to the chopper and the chopping continued for three minutes. The temperature of the emulsion out of the chopper was 99° F. The product was then immediately stuffed in saran casings and cooked in 160° F. water to an internal temperature of 152° F. The resulting product showed no separation, was very smooth in appearance, and had an excellent body. The analysis of the finished product was 38.6 percent fat, 12.6 percent protein, and 44.3 percent moisture.

Using the same formula as above for comparative purposes, a cold chopping procedure was employed. The meat entering into the formula subjected to the cold chop consisted of 110 lbs. pork liver, 90 lbs. neck fat, 2½ lbs. cow meat, and 2½ lbs. bacon ends and pieces. The neck fat, cow meat, and bacon pieces were first individually ground through a ⅛" plate. The livers were trimmed but left whole. The pork liver, cow meat, seasoning, and curing material were introduced to a conventional chopper and chopped for 20 minutes. At this point the neck fat and bacon pieces were added and chopping continued for an additional five minutes. The emulsion temperature out of the chopper was 60° F. The emulsion was stuffed into casings and subjected to a cook in a water bath, with the temperature of the water being raised slowly from 130° to 155° F. The product was processed to an internal temperature of 152° F. Early in the cooking there was a noticeable separation of the fat from the emulsion. Upon further standing there was still more pronounced separation of fat.

*Example III*

The work of this example was undertaken to determine whether it was necessary to the obtaining of a stable, high-fat product to preheat the fat before the formation of the emulsion. In this instance a sanitary stainless steel, high-speed hammer mill of the type used by sausage manufacturers in the preparation of potted meat foods, was employed to manufacture the emulsion. For this test the mill was operated at the speed of 1800 R. P. M. and a head of 16 fixed knives was employed to chop the meat. The ingredients of the formula were force-fed by a screw into the mill where the fixed blades finely chopped the ingredients into the emulsion which passed through a fine screen of 3/16" round holes into a hopper below the mill. The mill was adjusted so that by forced feeding with cold ingredients, the emulsion temperature out of the mill was 98° F. The formula of 36 lbs. pork liver, 36 lbs. neck fat, 20 lbs. cow meat, and 8 lbs. bacon was introduced at 45° F. The bacon, liver, and neck fat had been preground through a one-inch plate, and the cow meat through a quarter-inch plate prior to their introduction to the hammer mill. Following grinding the several meats were mixed together along with conventional liver sausage spicing and curing salts. This mixture was then force-fed into the mill.

The temperature of the emulsion out of the sanitary hammer mill may be readily varied by changing the chopping head (varying the type or number of knives), the R. P. M., the screens at the outlet of the mill and other factors effecting the amount of mechanical working of the emulsion within the mill.

The hot emulsion out of the mill was stuffed into saran casings and cooked in 160° F. water to an internal temperature of 154° F. In the finished product there was no separation of fat from the rest of the emulsion. The product had an analysis of 46.3 percent moisture, 34.2 percent fat, and 14.3 percent protein.

Obviously, many modifications and variations of the invention as hereinbefore set forth may be made without departing from the spirit and scope thereof, and therefore only such limitations should be imposed as are indicated in the appended claims.

We claim:

1. In the manufacture of a liver sausage having a high fat content and a stable emulsion, the steps comprising chopping the liver and the fat together to form an emulsion, said chopping being discontinued when the emulsion is at a temperature within the range of 88–122° F., stuffing the emulsion into the casings, and thereafter cooking the stuffed sausage, said cooking being commenced before the temperature of the emulsion cools below 88° F.

2. In the manufacture of a liver sausage having a high fat content and a stable emulsion, the steps comprising preheating the fat, chopping the hot fat and liver together to form an emulsion, said chopping being discontinued when the emulsion is at a temperature within the range of 95–105° F., stuffing the emulsion into casings, and thereafter cooking the stuffed sausage, said cooking being commenced before the temperature of the emulsion cools below 88° F.

3. A method of manufacture in accordance with claim 2, wherein the fat is preheated by cooking direct in hot water.

4. In a method of manufacturing a liver sausage containing fat as one of its ingredients, the steps comprising chopping the liver and the fat together to form an emulsion, said chopping being discontinued when the emulsion is at a temperature within the range of 95–105° F., stuffing the emulsion into casings, and thereafter cooking the stuffed sausage, said cooking being commenced before the temperature of the emulsion cools below 88° F.

5. In a method of manufacturing a liver sausage containing fat as one of its ingredients, the steps comprising preheating the fat, chopping the hot fat and liver together to form an emulsion, said chopping being discontinued when the emulsion is at a temperature within the range of 88–122° F., stuffing the emulsion into casings, and thereafter cooking the stuffed sausage, said cooking being commenced before the temperature of the emulsion cools below 88° F.

References Cited in the file of this patent

UNITED STATES PATENTS

| | | |
|---|---|---|
| 448,341 | Hirschauer | Mar. 17, 1891 |
| 2,060,160 | Allen | Nov. 10, 1936 |
| 2,355,548 | Musher | Aug. 8, 1944 |

FOREIGN PATENTS

| | | |
|---|---|---|
| 714,763 | Great Britain | Sept. 1, 1954 |